(12) United States Patent
Lau et al.

(10) Patent No.: US 10,123,374 B2
(45) Date of Patent: Nov. 6, 2018

(54) USING A TEMPORARY DEFAULT BEARER FOR A PACKET DATA NETWORK SESSION

(71) Applicant: Verizon Patent and Licensing Inc., Arlington, VA (US)

(72) Inventors: Priscilla Lau, Fremont, CA (US); Wing-Cheong V. Yeung, San Ramon, CA (US); Emerando M. Delos Reyes, Pleasant Hill, CA (US); Niranjan B. Avula, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 398 days.

(21) Appl. No.: 14/847,327

(22) Filed: Sep. 8, 2015

(65) Prior Publication Data
US 2017/0070921 A1    Mar. 9, 2017

(51) Int. Cl.
| | | |
|---|---|---|
| *H04W 4/00* | (2018.01) | |
| *H04W 76/25* | (2018.01) | |
| *H04W 36/00* | (2009.01) | |
| *H04W 76/36* | (2018.01) | |
| *H04W 88/16* | (2009.01) | |
| *H04W 76/12* | (2018.01) | |
| *H04W 76/38* | (2018.01) | |

(52) U.S. Cl.
CPC ....... *H04W 76/25* (2018.02); *H04W 36/0022* (2013.01); *H04W 76/36* (2018.02); *H04W 76/12* (2018.02); *H04W 76/38* (2018.02); *H04W 88/16* (2013.01)

(58) Field of Classification Search
CPC ... H04W 4/70; H04W 76/022; H04W 76/025; H04W 76/068; H04W 76/12; H04W 76/36; H04W 76/38; H04W 36/0022
USPC .......... 370/311, 329, 331, 332, 230, 252
See application file for complete search history.

(56) References Cited

U.S. PATENT DOCUMENTS

| | | | |
|---|---|---|---|
| 8,989,124 B1* | 3/2015 | Ramamurthy ...... | H04W 76/022 370/329 |
| 2014/0241321 A1* | 8/2014 | Wong ................ | H04W 36/0022 370/331 |
| 2015/0139095 A1* | 5/2015 | Chandramouli ........ | H04W 4/70 370/329 |

OTHER PUBLICATIONS

Basir, "3GPP Long Term Evolution (LTE)," http://4g-lte-world.blogspot.com/2012/05/default-bearer-dedicated-bearer-what.html, May 20, 2012, 7 pages.

(Continued)

*Primary Examiner* — Harun Chowdhury

(57) ABSTRACT

A device may receive a request to establish a packet data network (PDN) session for a user device. The device may provide a first instruction to establish the PDN session for the user device with a temporary default bearer based on receiving the request. The temporary default bearer may be maintained for less than a duration of the PDN session. The device may receive an indication to release the temporary default bearer after providing the first instruction to establish the PDN session. The device may provide a second instruction to release the temporary default bearer and maintain one or more signaling sessions associated with the PDN session based on receiving the indication to release the temporary default bearer. The one or more signaling sessions, associated with the PDN session, may be maintained after the temporary default bearer has been released.

20 Claims, 7 Drawing Sheets

(56) References Cited

OTHER PUBLICATIONS

Choi, "VoLTE: Understanding of GTP TEID to use in LTE trouble shooting," http://hongjoo71-e.blogspot.com/2015/06/volte-gtp-teid_17.html, Jun. 17, 2015, 4 pages.
U.S. Appl. No. 14/611,877, filed Feb. 2015, Huang et al.

* cited by examiner

USING A TEMPORARY DEFAULT BEARER FOR A PACKET DATA NETWORK SESSION

BACKGROUND

A bearer, or a bearer service, may refer to a telecommunication service used to transfer user data and/or control signals between devices. A bearer is typically characterized by a set of network parameters that define specific data treatment for data being transferred using the bearer. For example, the network parameters may include an originating address (e.g., a source address), a terminating address (e.g., a destination address), a data transfer rate, a quality of service treatment, guaranteed or non-guaranteed bit rate, or the like. In other words, a bearer is a medium over which data is transferred via a network.

When a long term evolution (LTE) user device uses a service provided by a network, the user device may need to set up a packet data network (PDN) session supporting the desired service. A PDN session may contain signaling sessions, associated with network devices and the user device, that are required to support signaling communications to provide and manage the service requested by the user device, as well as a default bearer connection that is set up by using those signaling sessions to allow data transmission between the network and the user device. A default bearer may refer to the first bearer connection that is set up between a serving gateway (SGW) and a PDN gateway (PGW) at the creation of a new PDN session. The default bearer may support best effort services by the network.

DETAILED DESCRIPTION OF PREFERRED EMBODIMENTS

The following detailed description of example implementations refers to the accompanying drawings. The same reference numbers in different drawings may identify the same or similar elements.

When a user device attaches to a radio access network, such as a long term evolution (LTE) network, the user device requests establishment of a packet data network (PDN) session with a default bearer to allow data to be transmitted between the user device and a PDN and/or between the user device and another endpoint via the PDN. This default bearer is a permanent default bearer that remains established between a serving gateway (SGW) and a PDN gateway (PGW) for the entire duration of the PDN session. In other words, the permanent default bearer is established in association with establishing the PDN session, and is released in association with releasing the PDN session. However, not all applications that execute on user devices require a permanent default bearer, particularly applications that infrequently send and receive data.

Implementations described herein relate to a temporary default bearer that does not last for the duration of the PDN session. In other words, a temporary default bearer may be released and/or re-established while a PDN session is maintained (e.g., while a signaling session, associated with the PDN session, is maintained). Thus, implementations described herein conserve network resources and memory resources by releasing default bearers that are not being used. Furthermore, implementations described herein conserve processing resources and increase the speed of data session re-establishment by maintaining signaling sessions that would otherwise have to be re-established when a default bearer is released and re-established. Furthermore, implementations described herein permit network devices to page a user device when there is downlink data to be sent to the user device, which does not require the user device to support short message service (SMS) or other techniques for device wake-up, thereby simplifying the requirements and reducing the manufacturing cost of the user device.

Figure 1A:
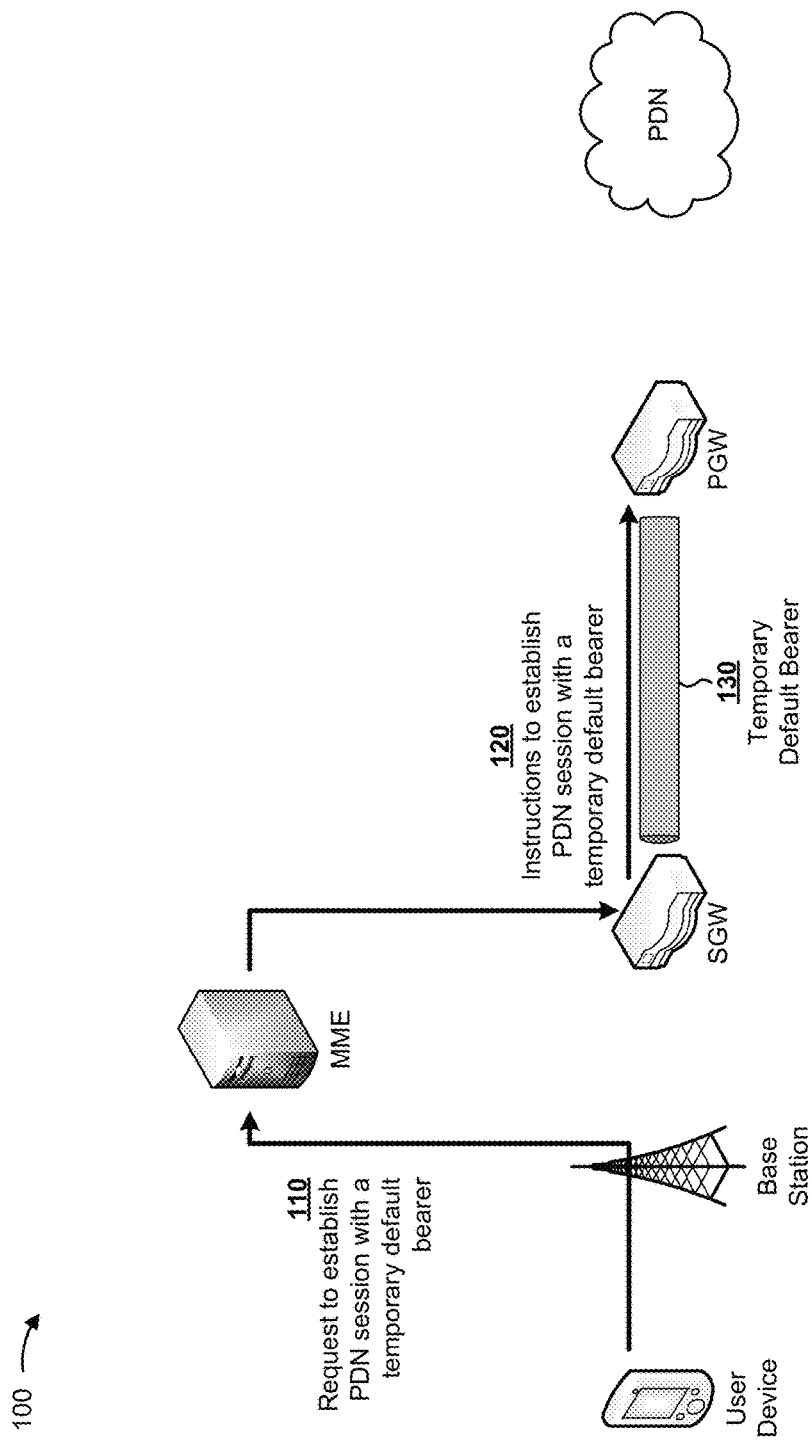
FIGS. 1A-1C are diagrams of an overview of an example implementation described herein.
Figure 1B:
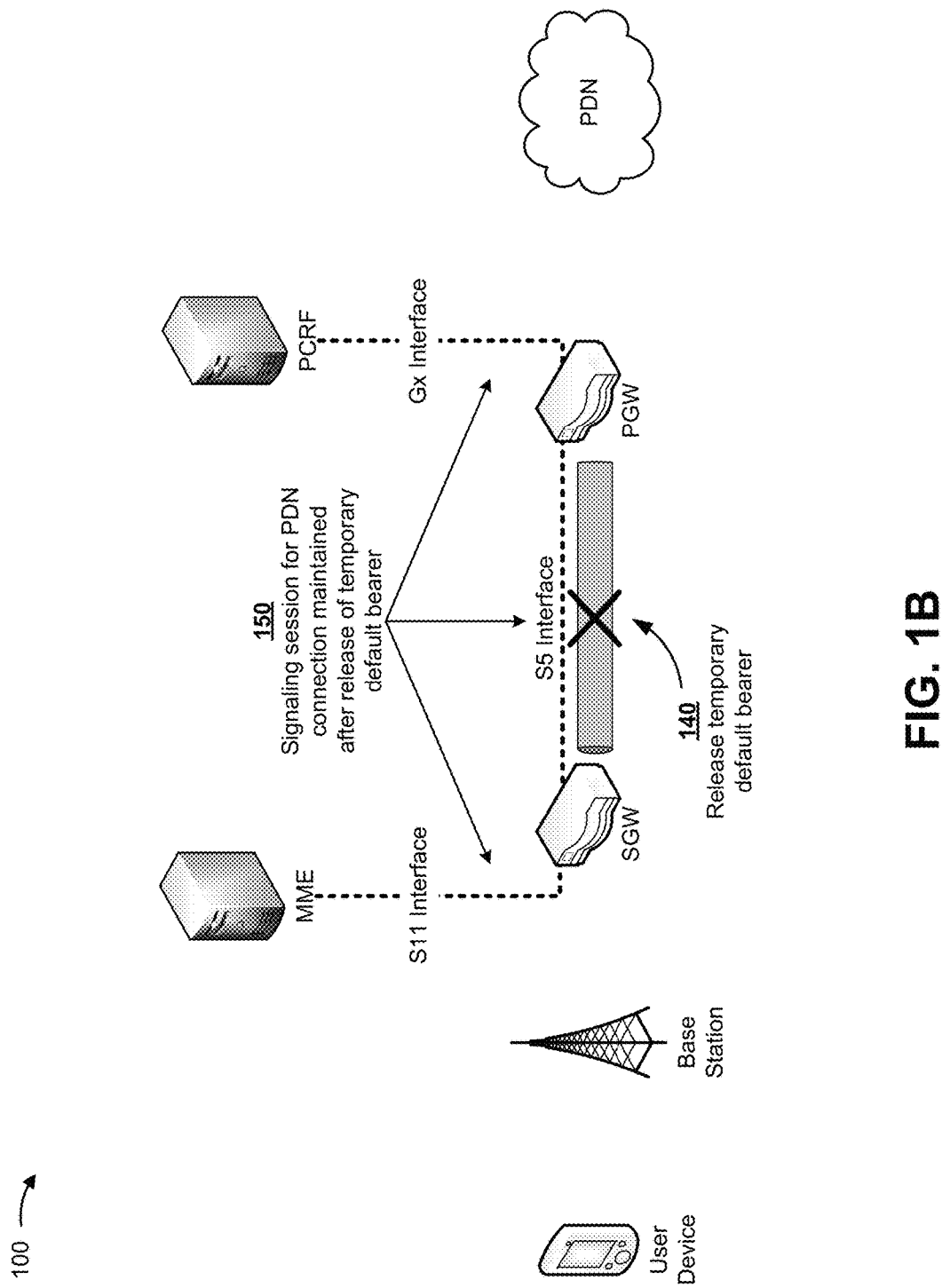
Figure 1C:
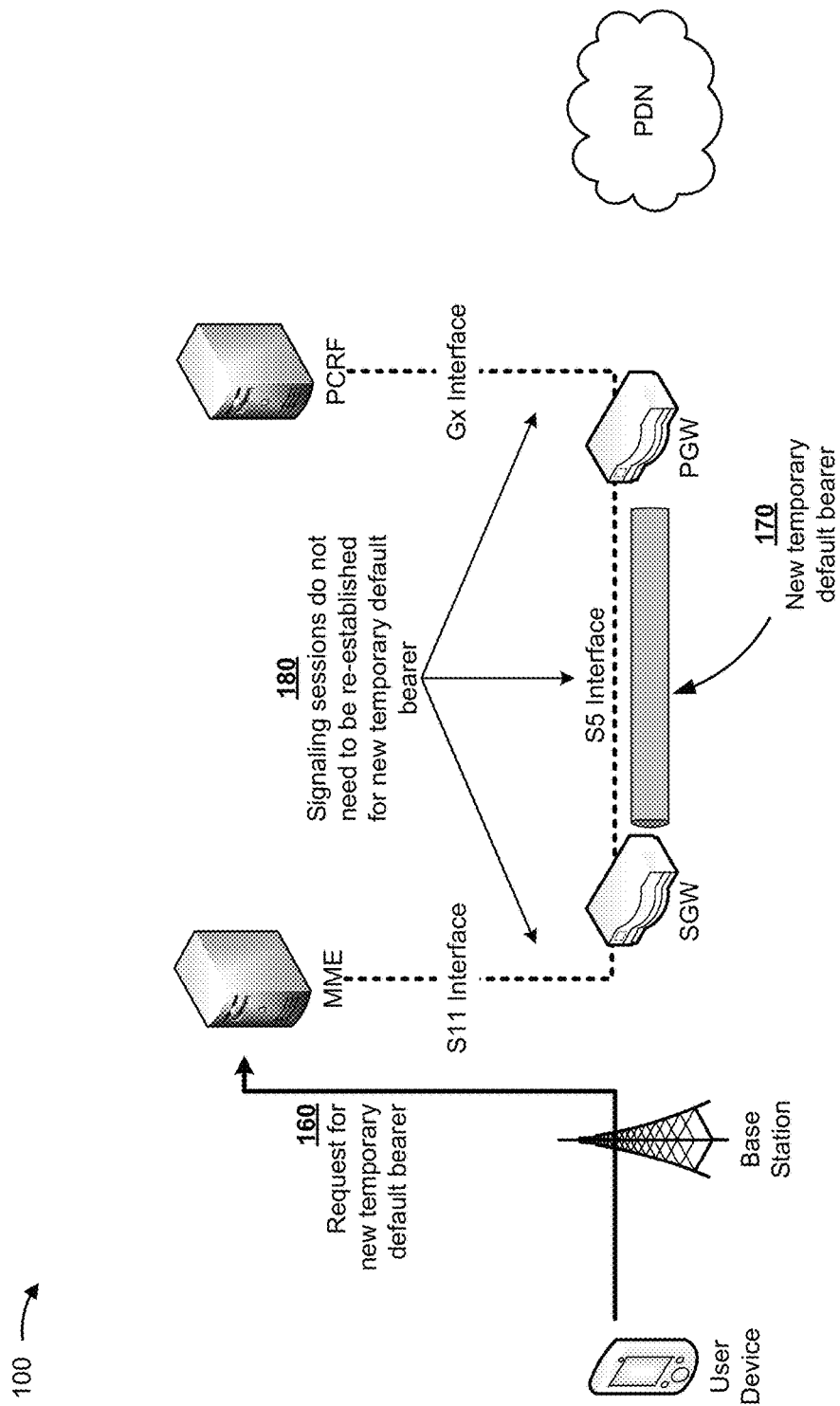

FIGS. 1A-1C are diagrams of an overview of an example implementation 100 described herein. As shown in FIG. 1A, and by reference number 110, a user device (e.g., a mobile phone) may send a request, via a base station, to a mobility management entity device (MME). The request may be a request to establish a PDN session with a temporary default bearer that is not maintained for the duration of the PDN session. As shown by reference number 120, based on the request, the MME may send instructions to establish a PDN session with a temporary default bearer. As shown, the instructions may be sent to a serving gateway (SGW) and a PDN gateway (PGW) (e.g., via the SGW). Based on receiving the instructions, the PGW may establish a PDN session between the user device and a PDN (e.g., via the base station, the SGW, and the PGW) with a temporary default bearer, as shown by reference number 130. Establishing the PDN session may include establishing one or more signaling sessions, as described below.

As shown in FIG. 1B, and by reference number 140, the temporary default bearer, which is has been established between the SGW and the PGW to carry user plane data, may be released at a later time without releasing the PDN session. For example, the MME may receive an indication, from the user device and/or the PGW, to release the temporary default bearer, as described in more detail elsewhere herein. In some implementations, the MME may provide an instruction to release the temporary default bearer, and one or more devices (e.g., the user device, the base station, the SGW, the PGW, etc.) may release the temporary default bearer based on the instruction. The establishment and release of the connections between the user device and the base station and between the base station and the SGW may be released (e.g., according to a defined procedure).

However, as shown by reference number 150, one or more signaling sessions, associated with the PDN session, may be maintained after the release of the temporary default bearer. For example, the MME and the SGW may maintain a signaling session via an S11 interface, the SGW and the PGW may maintain a signaling session via an S5 interface, and the PGW and a policy charging and rules function device (PCRF) may maintain a signaling session via a Gx interface. Maintaining these signaling sessions may allow another temporary default bearer to be set up quickly whenever needed (e.g., when there is data to be transmitted to or received from the user device) because these signaling sessions may be required to be set up before a default bearer may be set up. Releasing the temporary default bearer when the temporary default bearer is not being used may free up network resources allocated to the temporary default bearer by the SGW and the PGW, so that these network resources can be used for other default bearers.

As shown in FIG. 1C, and by reference number 160, the MME may receive a request for a new temporary default bearer (e.g., from the user device). As shown by reference number 170, a new temporary default bearer may be established in a similar manner as described above in connection with FIG. 1A (e.g., by providing instructions to the SGW and PGW to establish the new temporary default bearer). As shown by reference number 180, establishment of the new temporary default bearer may not require re-establishment of signaling sessions because the signaling sessions have been maintained after the previous temporary default bearer was released. In this way, the new temporary default bearer may be established more quickly and using fewer processing resources than if the signaling sessions had to be re-established. Additional details regarding establishing and releasing temporary default bearers for a PDN session are described in more detail below.

Figure 2:
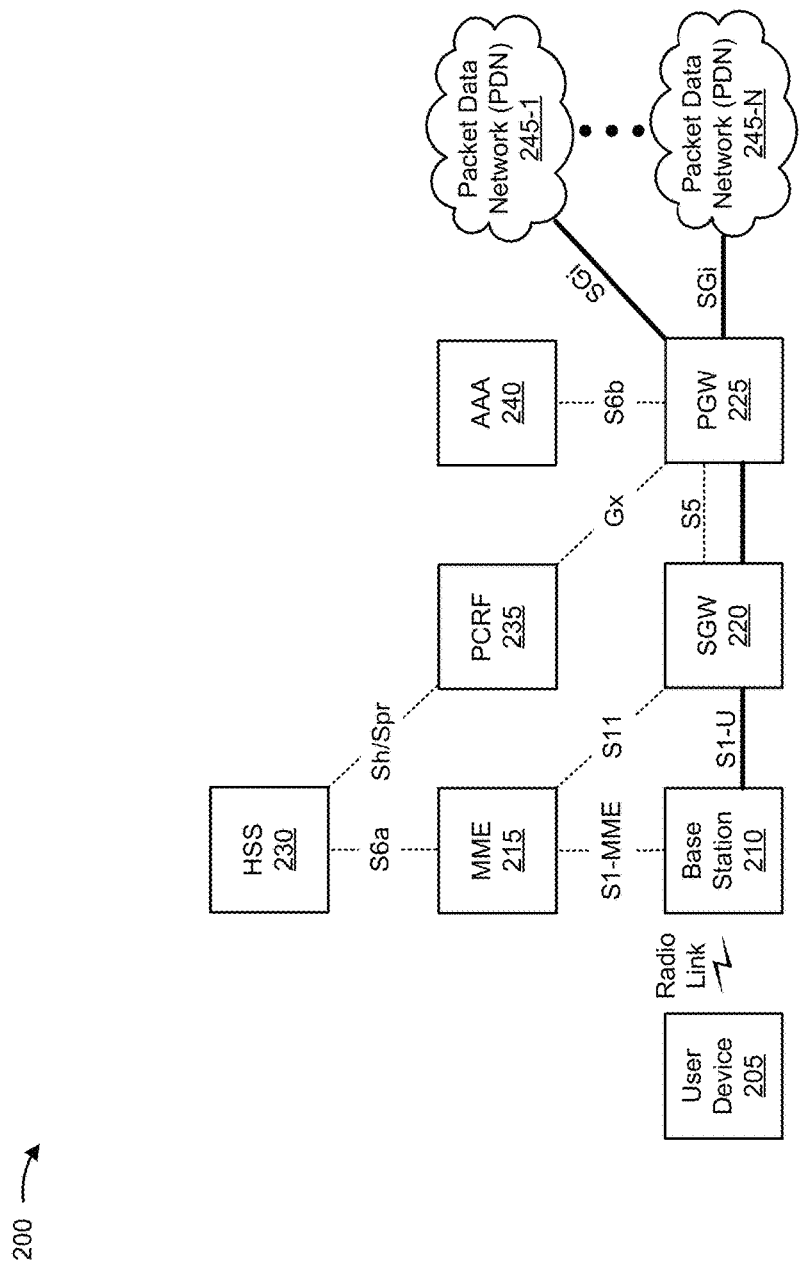
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205, a base station 210, a mobility management entity device (MME) 215, a serving gateway (SGW) 220, a packet data network gateway (PGW) 225, a home subscriber server (HSS) 230, a policy and charging rules function device (PCRF) 235, an authentication, authorization, and accounting server (AAA) 240, and one or more packet data networks (PDNs) 245-1 through 245-N(N≥1) (hereinafter referred to collectively as "PDNs 245" and individually as "PDN 245"). Devices of environment 200 may interconnect via wired connections, wireless connections, or a combination of wired and wireless connections.

User device 205 may include one or more devices capable of communicating with base station 210 and/or a network (e.g., PDN 245). For example, user device 205 may include an Internet of Things (IoT) device, a machine-to-machine (M2M) device, a mobile phone (e.g., a cell phone, a smart phone, etc.), a tablet computer, a laptop computer, a wireless hotspot device, a personal gaming system, or a similar type of device. User device 205 may send traffic to and/or receive traffic from PDN 245 (e.g., via base station 210, SGW 220, and/or PGW 225) using a temporary default bearer.

Base station 210 may include one or more devices capable of transferring traffic, such as audio, video, text, and/or other traffic, destined for and/or received from user device 205. In some implementations, base station 210 may include an eNB associated with an LTE network that receives traffic from and/or sends traffic to PDN 245 via SGW 220 and/or PGW 225. Additionally, or alternatively, one or more base stations 210 may be associated with a RAN that is not associated with the LTE network. Base station 210 may send traffic to and/or receive traffic from user device 205 via an air interface. In some implementations, base station 210 may include a small cell base station, such as a base station of a microcell, a picocell, and/or a femtocell.

MME 215 may include one or more devices, such as one or more server devices, capable of managing authentication, activation, deactivation, and/or mobility functions associated with user device 205. In some implementations, MME 215 may perform operations relating to authentication of user device 205. Additionally, or alternatively, MME 215 may facilitate the selection of a particular SGW 220 and/or a particular PGW 225 to serve traffic to and/or from user device 205. MME 215 may perform operations associated with handing off user device 205 from a first base station 210 to a second base station 210 when user device 205 is transitioning from a first cell associated with the first base station 210 to a second cell associated with the second base station 210. Additionally, or alternatively, MME 215 may select another MME (not pictured), to which user device 205 should be handed off (e.g., when user device 205 moves out of range of MME 215). In some implementations, MME 215 may establish a signaling session with base station 210 using an S1-MME interface, with HSS 230 using an S6a interface, and/or with SGW 220 using an S11 interface.

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or a similar type of device that processes and/or transfers traffic. In some implementations, SGW 220 may aggregate traffic received from one or more base stations 210, and may send the aggregated traffic to PDN 245 (e.g., via PGW 225) and/or other network devices. SGW 220 may also receive traffic from PDN 245 and/or other network devices, and may send the received traffic to user device 205 via base station 210. Additionally, or alternatively, SGW 220 may perform operations associated with handing off user device 205 to and/or from an LTE network. In some implementations, SGW 220 may establish a signaling session with MME 215 using an S11 interface and/or with PGW 225 using an S5 interface.

PGW 225 may include one or more devices capable of providing connectivity for user device 205 to external packet data networks. For example, PGW 225 may include one or more data processing and/or traffic transfer devices, such as a gateway, a router, a modem, a switch, a firewall, a NIC, a hub, a bridge, a server device, an OADM, or a similar type of device that processes and/or transfers traffic. In some implementations, PGW 225 may aggregate traffic received from one or more SGWs 220, and may send the aggregated traffic to PDN 245. Additionally, or alternatively, PGW 225 may receive traffic from PDN 245, and may send the traffic to user device 205 via SGW 220 and base station 210. PGW 225 may record data usage information (e.g., byte usage), and may provide the data usage information to AAA 240. In some implementations, PGW 225 may establish a signaling session with SGW 220 using an S5 interface, with PCRF 235 using a Gx interface, with AAA 240 using an S6b interface, and/or with PDN 245 (e.g., a network device of PDN 245) using an SGi interface.

HSS 230 may include one or more devices, such as one or more server devices, capable of managing (e.g., receiving, generating, storing, processing, and/or providing) subscriber information associated with user device 205. The subscriber information may include, for example, information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, a quantity of data consumption allowed per time period, etc.), and/or similar information. HSS 230 may provide the subscriber information to one or more other devices of environment 200 to support the operations performed by those devices. In some implementations, HSS 230 may establish a signaling session with MME 215 using an S6a interface and/or with PCRF 235 using an Sh/Spr interface.

PCRF 235 may include one or more network devices, such as one or more servers. PCRF 235 may store policy information associated with user device 205, such as voice call and data rate plans or quotas for subscribers. PCRF 235 may provide network control regarding service data flow detection, gating, quality of service (QoS), and/or flow-based charging based on policy information. Policy information may include, for example, policies and/or rules instructing user device 205 and/or network elements (base station 210, MME 215, SGW 220, PGW 225, etc.) to minimize packet loss, to implement a packet delay budget, to provide a guaranteed bit rate (GBR), to provide a particular latency, to reduce RF signal congestion, and/or to perform other activities associated with QoS (e.g., for a bearer). PCRF 235 may provide policy information to other network devices, such as base station 210, SGW 220, PGW 225, or the like, to implement network control. PCRF 235 may determine how a certain service data flow shall be treated, and may ensure that user plane traffic mapping and QoS is in accordance with policy information.

AAA 240 may include one or more devices, such as one or more server devices, that perform authentication, authorization, and/or accounting operations for communication sessions associated with user device 205. For example, AAA 240 may perform authentication operations for user device 205 and/or a user of user device 205 (e.g., using one or more credentials), may control access, by user device 205, to a service and/or an application (e.g., based on one or more restrictions, such as time-of-day restrictions, location restrictions, single or multiple access restrictions, read/write restrictions, etc.), may track resources consumed by user device 205 (e.g., a quantity of voice minutes consumed, a quantity of data consumed, etc.), and/or may perform similar operations.

PDN 245 may include one or more wired and/or wireless networks. For example, PDN 245 may include a cellular network (e.g., an LTE network, a third generation (3G) network, a fourth generation (4G) network, a code division multiple access (CDMA) network, etc.), a public land user network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks. In some implementations, PDN 245 may include an Internet Protocol Multimedia Subsystem (IMS) core network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
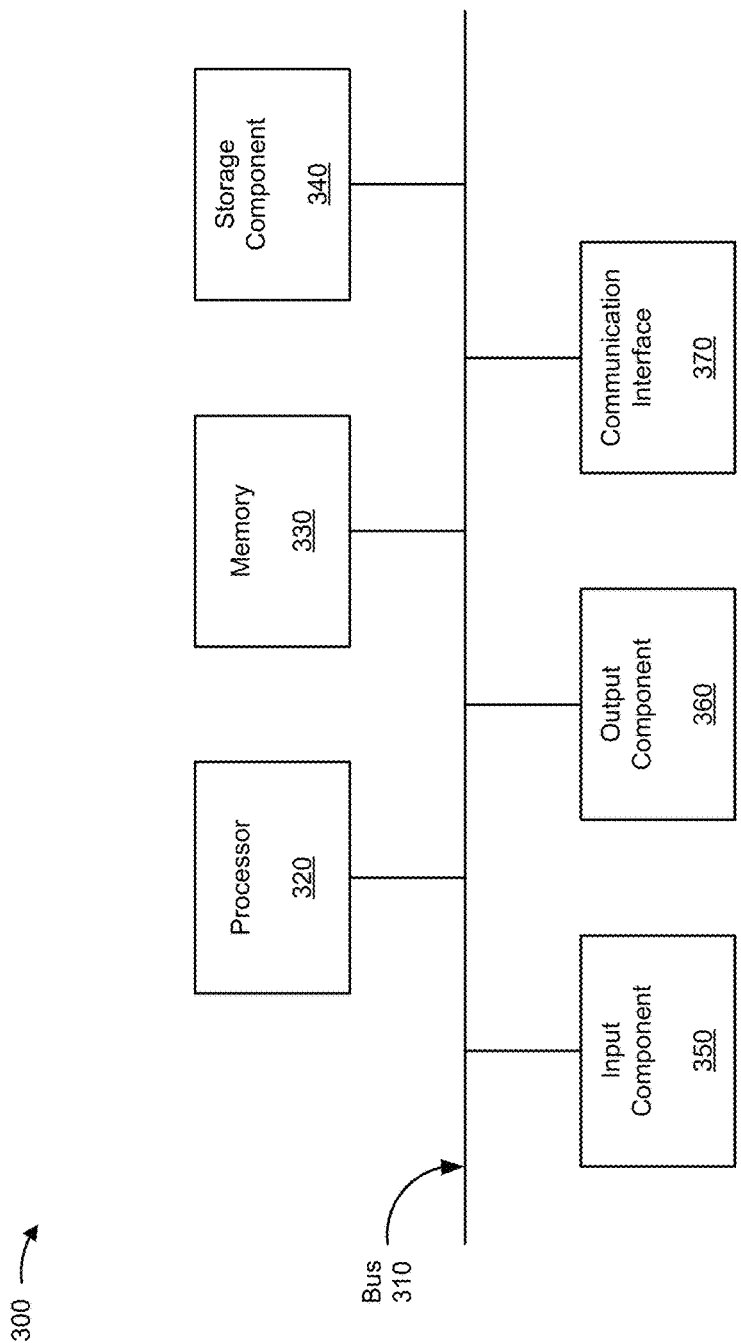
FIG. 3 is a diagram of example components of one or more devices of FIG. 2.

FIG. 3 is a diagram of example components of a device 300. Device 300 may correspond to user device 205, base station 210, MME 215, SGW 220, PGW 225, HSS 230, PCRF 235, and/or AAA 240. In some implementations, user device 205, base station 210, MME 215, SGW 220, PGW 225, HSS 230, PCRF 235, and/or AAA 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
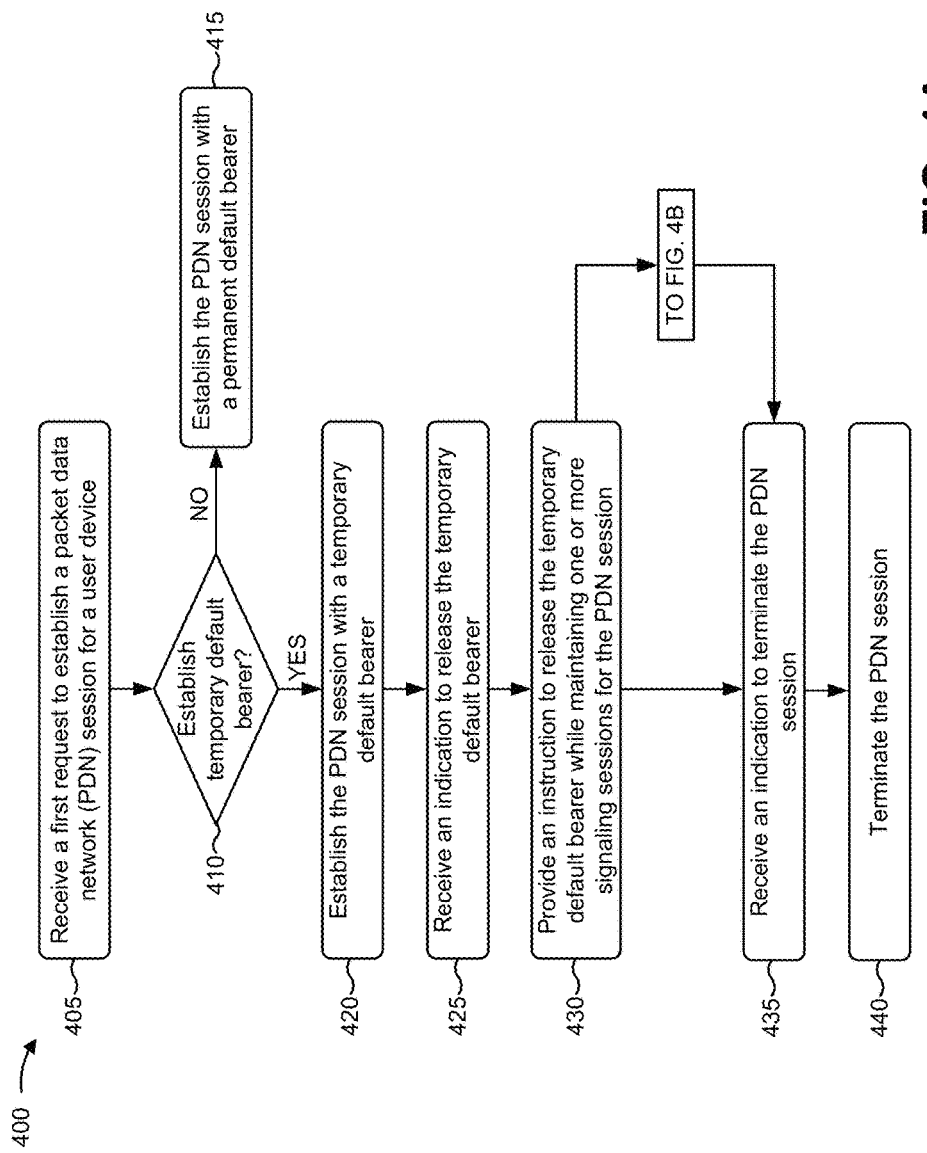
FIGS. 4A and 4B are flow charts of an example process for using a temporary default bearer for a packet data network (PDN) session.
Figure 4B:
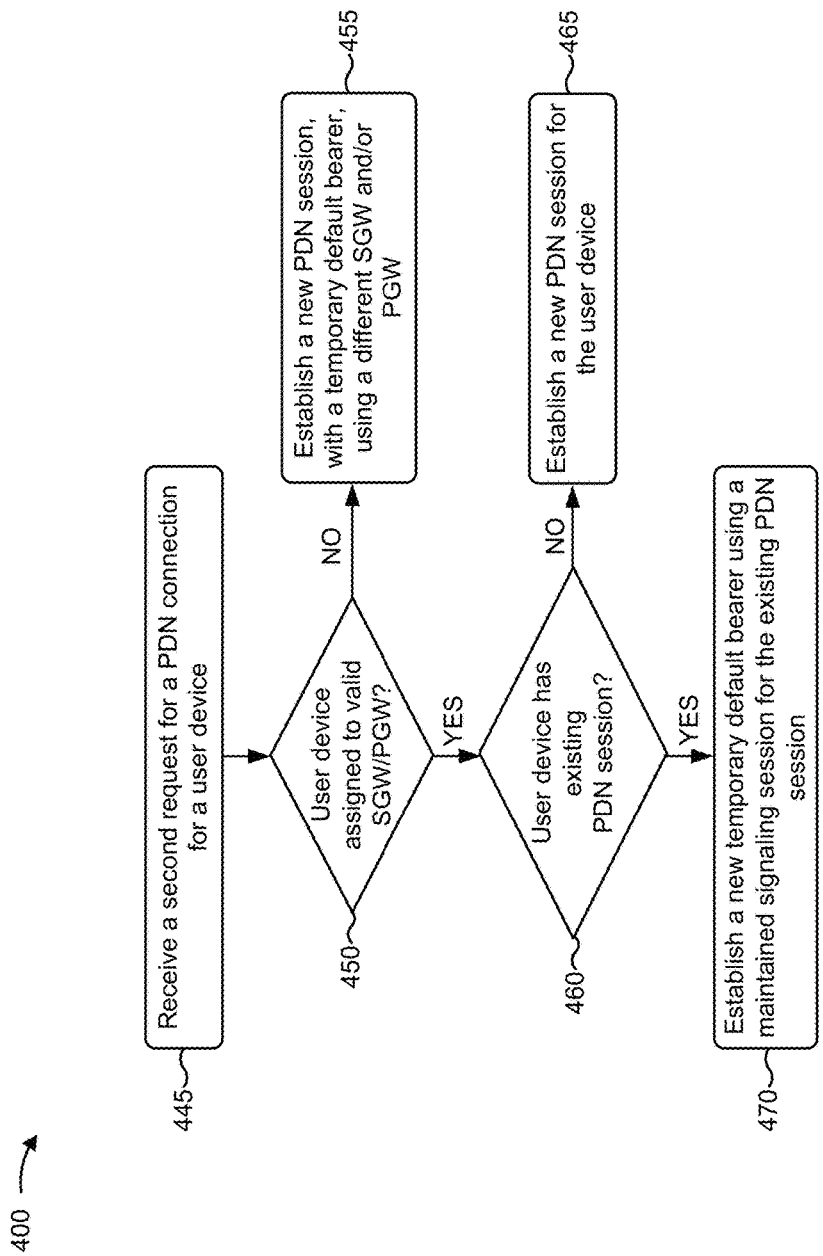

FIGS. 4A and 4B are flow charts of an example process 400 for using a temporary default bearer for a PDN session. In some implementations, one or more process blocks of FIGS. 4A and 4B may be performed by MME 215. In some implementations, one or more process blocks of FIGS. 4A and 4B may be performed by another device or a group of devices separate from or including MME 215, such as user device 205, base station 210, SGW 220, PGW 225, HSS 230, PCRF 235, and/or AAA 240.

As shown in FIG. 4A, process 400 may include receiving a first request to establish a packet data network (PDN) session for a user device (block 405). For example, MME 215 may receive, from user device 205 and via base station 210, a first request (e.g., an attachment request) to establish a PDN session. For example, when user device 205 powers up or enters a coverage area associated with MME 215 (e.g., an LTE coverage area), user device 205 may perform a network attachment procedure with MME 215. As part of the network attachment procedure, user device 205 may request to establish a PDN session so that user device 205 may communicate with other devices.

As further shown in FIG. 4A, process 400 may include determining whether to establish a temporary default bearer for the PDN session (block 410). For example, MME 215 may determine whether to establish a temporary default bearer for the PDN session request by user device 205. A temporary default bearer may refer to a default bearer that is not maintained for the duration of the PDN session. In other words, a temporary default bearer may be established independent of establishing a PDN session, and may be released independent of releasing a PDN session, such that a PDN session and/or a signaling session for the PDN session may be maintained without a default bearer.

In some implementations, MME 215 may determine whether to establish a temporary default bearer for user device 205 based on receiving an indication of whether user device 205 supports temporary default bearers. For example, user device 205 may indicate, in association with the first request to establish the PDN session, whether user device 205 supports temporary default bearers. In some implementations, the indication may be included in the first request (e.g., the attachment request).

In some implementations, MME 215 may determine whether to establish a temporary default bearer for user device 205 based on receiving subscriber information, associated with user device 205, that indicates whether to permit temporary default bearers for user device 205. In some implementations, MME 215 may receive the subscriber information from HSS 230. For example, MME 215 may receive the attachment request from user device 205, and may determine a subscriber identifier associated with user device 205 (e.g., a subscriber name, a mobile device number (MDN), an international mobile subscriber identifier (IMSI), an international mobile equipment identity (IMEI), or the like). MME 215 may provide the subscriber identifier to HSS 230. HSS 230 may use the subscriber identifier to retrieve the stored subscriber profile and return the subscriber profile to MME 215. Among the parameters in the subscriber profile, there may be a new subscriber parameter, which may be configured by the network provider, indicating whether to permit temporary default bearers for user device 205 (e.g., based on whether temporary default bearers are enabled or disabled for user device 205).

Thus, MME 215 may determine whether to establish a temporary default bearer for user device 205 based on an indication (e.g., from user device 205) of whether user device 205 supports the temporary default bearer and/or based on an indication (e.g., from HHS 230) of whether to permit the temporary default bearer for user device 205. In this way, MME 215 may provide mobility functions and network connectivity for user devices 205 that support and are allowed to use temporary default bearers, as well as user devices 205 that do not support or are not allowed to use temporary default bearers. In this way, MME 215 may flexibly support a greater quantity of user devices 205 than if only one type of user device 205 was supported.

In some implementations, MME 215 may receive, from HSS 230, information that identifies a PDN duration timer that indicates a length of time that a PDN session, associated with a temporary default bearer, is to be maintained (e.g., based on a subscriber profile, based on a default length of time, etc.). The PDN duration timer is described in more detail below.

As further shown in FIG. 4A, if the temporary default bearer is not to be established (block 410—NO), then process 400 may include establishing the PDN session with a permanent default bearer (block 415). For example, if MME 215 determines that user device 205 does not support temporary default bearers or is not permitted to use temporary default bearers, then MME 215 may establish the PDN session with a permanent default bearer. A permanent default bearer may refer to a default bearer that is active for the entire duration of the PDN session. In other words, a permanent default bearer is established based on establishing a PDN session, and is released based on releasing the PDN session, and the PDN session and all associated signaling sessions cannot be maintained without the permanent default bearer being maintained. As a result, user device 205 may need to re-establish a new PDN session when user device 205 wants to receive a PDN service.

In some implementations, MME 215 may establish the PDN session using a permanent default bearer by providing one or more instructions to other network devices to cause the PDN session to be established (e.g., between user device 205 and PDN 245). The one or more instructions may indicate that the PDN session is to be established using a permanent default bearer. For example, MME 215 may provide an instruction to SGW 220 to assist with establishing the PDN session with the permanent default bearer, may provide an instruction to PGW 225 (e.g., via SGW 220) to assist with establishing the PDN session with the permanent default bearer, or the like. In some implementations, MME 215 may identify a particular SGW 220 and/or a particular PGW 225 to serve user device 205 (e.g., based on a geographic location of user device 205 and a geographic region served by SGW 220 and/or PGW 225).

As further shown in FIG. 4A, if the temporary default bearer is to be established (block 410—YES), then process 400 may include establishing the PDN session with a temporary default bearer (block 420). For example, if MME 215 determines that user device 205 supports temporary default bearers and is permitted to use temporary default bearers, then MME 215 may establish the PDN session with a temporary default bearer. In some implementations, MME 215 may establish the PDN session with a temporary default bearer by providing one or more instructions to other network devices to cause the PDN session to be established (e.g., between user device 205 and PDN 245). The one or more instructions may indicate that the PDN session is to be established with a temporary default bearer between SGW 220 and PGW 225. For example, MME 215 may provide an instruction to SGW 220 to assist with establishing the PDN session with the temporary default bearer, may provide an instruction to PGW 225 (e.g., via SGW 220) to assist with establishing the PDN session with the temporary default bearer, or the like. In some implementations, MME 215 may identify a particular SGW 220 and/or a particular PGW 225 to serve user device 205, as described above in connection with block 415. In some implementations, the one or more instructions may be sent using a "Create Session Request" message.

In some implementations, an instruction sent to SGW 220 may include a signaling message that causes SGW 220 to maintain one or more signaling sessions for the PDN session when the temporary default bearer is released. For example, the signaling message may cause SGW 220 to maintain a signaling session with MME 215 (e.g., via an S11 interface), to maintain a signaling session with PGW 225 (e.g., via an S5 interface), and/or to maintain a signaling session with another network device.

Similarly, an instruction sent to PGW 225 (e.g., via SGW 220) may include a signaling message that causes PGW 225 to maintain one or more signaling sessions for the PDN session when the temporary default bearer is released. For example, the signaling message may cause PGW 225 to maintain a signaling session with SGW 220 (e.g., via an S5 interface), to maintain a signaling session with PCRF 235 (e.g., via a Gx interface), to maintain a signaling session with AAA 240 (e.g., via an S6B interface), to maintain a signaling session with a device associated with PDN 245 (e.g., via an SGi interface), and/or to maintain a signaling session with another network device.

Additionally, or alternatively, MME 215 may send information that identifies a PDN duration timer to PGW 225 (e.g., via SGW 220). The PDN duration timer may indicate a length of time that a PDN session (e.g., signaling session (s) associated with the PDN session) is to be maintained (e.g., without a default bearer between SGW 220 and PGW 225). The PDN duration timer is different from the existing PDN session timer at PGW 225 that causes PGW 225 to release all signaling sessions and default bearer(s) associated with the PDN after a particular time of inactivity by user device 205. The PDN duration timer may be shorter than, longer than, or equal to the PDN session timer since these timers are independent of one another and support different purposes. PGW 225 may maintain the PDN session for the length of time according to the PDN duration timer even if the temporary default bearer is released before the length of time expires. PGW 225 may start a PDN duration timer based on the length of time. When the length of time expires, PGW 225 may terminate the PDN session along with all signaling sessions, as described in more detail below.

As used herein, a signaling session may refer to a session between network devices (e.g., MME 215, SGW 220, PGW 225, HSS 230, PCRF 235, AAA 240, etc.) that is used for sending control signals associated with the PDN session for user device 205. In some implementations, a network device may store signaling information in memory when a signaling session is established, and may delete the signaling information from memory when the signaling session is terminated. In some implementations, a network device may maintain a signaling session associated with a PDN session by continuing to store signaling information in memory after a temporary default bearer has been released. This stored signaling information may then be used to quickly establish another temporary default bearer for the PDN session at a later time, thereby conserving network resources and processing resources.

In some implementations, the signaling information may include one or more user device identifiers that identify user device 205, such as an Internet Protocol (IP) address (e.g., assigned to user device 205 by PGW 225), an international mobile subscriber identity (IMSI), a temporary mobile subscriber identity (TMSI), a globally unique temporary identifier (GUTI), or the like. In this way, network devices that maintain the signaling information may quickly identify a user device 205 associated with a PDN session, a temporary default bearer to be established, or the like, thereby conserving network resources and processing resources. Furthermore, user device 205 may continue to use an IP address assigned by PGW 225, thereby conserving network resources and processing resources associated with re-assigning an IP address at a later time.

Additionally, or alternatively, the signaling information may include one or more network device identifiers that identify a network device (e.g., MME 215, SGW 220, PGW 225, HSS 230, PCRF 235, AAA 240, etc.) associated with a signaling session. For example, a network device identifier may include a tunnel endpoint identifier (TEID) that identifies a network device associated with a PDN session. For example, MME 215 may store a TEID that identifies SGW 220 that serves user device 205, and may store a TEID that identifies PGW 225 that serves user device 205. As another example, SGW 220 may store a TEID that identifies PGW 225 that serves user device 205. As another example, PGW 225 may store a TEID that identifies SGW 220 that serves user device 205, may store an IMSI that identifies PCRF 235 that stores policy information associated with user device 205, and may store an IMSI that identifies AAA 240 that stores information associated with user device 205. As another example, PCRF 235 may store an IMSI that identifies PGW 225 that serves user device 205. In this way, network devices that maintain the signaling information may quickly identify other network devices with which to communicate for a PDN session, to establish a temporary default bearer, or the like, thereby conserving network resources and processing resources.

Additionally, or alternatively, the signaling information may include bearer information that indicates a manner in which traffic received from and/or destined for user device 205 is to be treated. For example, the bearer information may be based on policy information (e.g., a charging policy, a QoS profile, or other policy information received from PCRF 235), subscriber information (e.g., a subscriber profile, information that identifies services accessible to user device 205, or other subscriber information received from HSS 230), or the like. For example, SGW 220 and/or PGW 225 may store bearer information that indicates how SGW 220 and/or PGW 225 are to handle network traffic associated with user device 205. In this way, network devices that maintain the signaling information may quickly identify bearer information for establishing a temporary default bearer for user device 205, thereby conserving network resources and processing resources.

Additionally, or alternatively, the signaling information may include mobility information, such as a location identifier that identifies a location associated with user device 205 (e.g., a geographic location, a cell, etc.), information that identifies a network device (e.g., SGW 220, PGW 225, etc.) assigned to serve user device 205 based on a location of user device 205, or the like. For example, MME 215 may maintain mobility information associated with user device 205 (e.g., after a temporary default bearer has been released). In this way, MME 215 may quickly identify mobility information associated with establishing a temporary default bearer for user device 205, thereby conserving network resources and processing resources.

Additionally, or alternatively, the signaling information may include authentication information or similar information stored by AAA 240. For example, the authentication information may indicate whether user device 205 is authenticated to access a network (e.g., PDN 245), to use a service, to use an application, or the like. In some implementations, PGW 225 may maintain authentication information received from AAA 240. In this way, PGW 225 may quickly establish a temporary default bearer for user device 205 without communicating with AAA 240 to re-authenticate user device 205, thereby conserving network resources and processing resources.

In this way, network devices that maintain signaling information associated with a PDN session may release a temporary default bearer to conserve network resources, while maintaining signaling information to further conserve network resources and processing resources when another temporary default bearer is established for the PDN session. For example, the network devices may conserve network resources and processing resources by storing signaling information in memory and keeping the signaling session active, rather than communicating with one another to set up a new signaling session every time user device 205 needs to re-establish a default bearer.

As further shown in FIG. 4A, process 400 may include receiving an indication to release the temporary default bearer (block 425). For example, MME 215 may receive, from user device 205 and/or PGW 225, a bearer release indicator that indicates that the temporary default bearer is to be released.

In some implementations, MME 215 may receive a bearer release indicator from user device 205. In some cases, user device 205 may send the bearer release indicator (e.g., a user device bearer release indicator) to MME 215 after expiration of a bearer release timer stored by user device 205 (e.g., a user device bearer release timer). As an example, user device 205 may start a bearer release timer after an initial attachment procedure with MME 215 is completed (e.g., upon establishing a temporary default bearer). Additionally, or alternatively, user device 205 may restart the bearer release timer after receiving a packet or transmitting a packet. In this way, user device 205 may assist with maintaining a temporary default bearer when user device 205 is actively communicating with other devices (e.g., is sending uplink communications to or receiving downlink communications from PDN 245). When the bearer release timer expires, user device 205 may send the bearer release indicator to MME 215. In this way, when user device 205 has not used a temporary default bearer for a threshold amount of time, the temporary default bearer may be released, thereby conserving network resources. In some implementations, the bearer release indicator may include a "PDN Disconnect Request" message.

Additionally, or alternatively, MME 215 may receive a bearer release indicator from PGW 225 (e.g., via SGW 220). In some cases, PGW 225 may send the bearer release indicator (e.g., a PGW bearer release indicator) to MME 215 after expiration of a bearer release timer stored by PGW 225 (e.g., a PGW bearer release timer). As an example, PGW 225 may start a bearer release timer after an initial attachment procedure with MME 215 is completed (e.g., upon establishing a temporary default bearer). Additionally, or alternatively, PGW 225 may restart the bearer release timer after receiving a packet or transmitting a packet associated with user device 205. In this way, PGW 225 may maintain a temporary default bearer when PGW 225 is actively communicating using the temporary default bearer. When the bearer release timer expires, PGW 225 may send the bearer release indicator to MME 215. Additionally, or alternatively, when the bearer release indicator expires, PGW 225 may release the temporary default bearer. In this way, when PGW 225 has not used a temporary default bearer for a threshold amount of time, the temporary default bearer may be released, thereby conserving network resources.

By using both a user device bearer release timer and a PGW bearer release timer, MME 215 may ensure receipt of a bearer release indicator even if the user device bearer release timer malfunctions or the user device bearer release indicator is not received by MME 215 (e.g., due to a network malfunction, due to user device 205 leaving a coverage area, etc.). In this way, MME 215 may ensure that a temporary default bearer is released when not in use (e.g., for a threshold amount of time), thereby conserving network resources. In some implementations, the PGW bearer release timer may be set for a duration that is longer than the user device bearer release timer due to a longer delay for the user device bearer release indicator to reach MME 215 as compared to the PGW bearer release indicator.

As further shown in FIG. 4A, process 400 may include providing an instruction to release the temporary default bearer while maintaining one or more signaling sessions for the PDN session (block 430). For example, MME 215 may provide an instruction to release the temporary default bearer based on receiving the bearer release indicator. In some implementations, MME 215 may provide the instruction to SGW 220 and/or PGW 225. For example, the instruction may be included in a signaling message, such as a "Delete Bearer Request" message, a "Delete Session Request" message, a "Delete Access Bearer Request" message, or the like.

The signaling message and/or the instruction may cause SGW 220 and/or PGW 225 to release the temporary default bearer for the PDN session associated with user device 205, but to maintain one or more signaling sessions of the PDN session. A signaling session may include signaling information, as described above in connection with block 420. In some implementations, a network device (e.g., SGW 220, PGW 225, MME 215, etc.) may receive and/or store signaling information when the PDN session is established, and may continue to store this signaling information after releasing the temporary default bearer. MME 215 may provide an instruction, to another network device (e.g., SGW 220, PGW 225, etc.) to maintain the signaling information, and/or may maintain signaling information locally on MME 215. Thus, the PDN session (e.g., one or more signaling sessions associated with the PDN session) may be maintained when there are no bearers (e.g., no default bearers, no dedicated bearers, or the like) for the PDN session.

For example, and as described above in connection with block 420, MME 215, SGW 220, and/or PGW 225 may continue to store one or more user device identifiers (e.g., that identify user device 205 associated with the PDN session), one or more network device identifiers (e.g., that identify other network devices with which SGW 220 and/or PGW 225 communicate in association with the PDN session), bearer information (e.g., that identifies a manner in which traffic associated with user device 205 and/or the PDN session is to be treated), authentication information (e.g., associated with user device 205), or the like. Additionally, or alternatively, MME 215 may continue to store mobility information associated with user device 205. This stored signaling information may be used to quickly establish another temporary default bearer for the PDN session at a later time, thereby conserving network resources and processing resources.

In some implementations, PGW 225 may release the temporary default bearer without receiving an instruction from MME 215 to release the temporary default bearer. For example, a bearer release timer stored by PGW 225 may expire, which may cause PGW 225 to release the temporary default bearer. In this case, PGW 225 may notify MME 215 that the bearer release timer has expired. MME 215 may then send an instruction (e.g., to SGW 220) to release the temporary default bearer. However, MME 215, SGW 220, PGW 225, and/or other network devices may maintain signaling sessions associated with the PDN session until an indication to terminate the PDN session is received, as described below.

As shown in FIG. 4A (by the block "TO FIG. 4B"), and as described below in connection with FIG. 4B, in some implementations, MME 215 may receive another request associated with the PDN session, and may determine whether to establish another temporary default bearer associated with the PDN session. This other temporary default bearer may be established before the PDN session is terminated. In some implementations, multiple (e.g., two, three, four, etc.) temporary default bearers may be sequentially established and released without terminating the PDN session, thereby conserving network resources. The process of managing an additional request to establish another temporary default bearer before the PDN session has been terminated is described below in connection with FIG. 4B.

In some implementations, MME 215 may not receive an additional request associated with the PDN session before receiving an indication to terminate the PDN session, as described below. In other words, one or more process blocks of FIG. 4B may or may not be performed before performing blocks 435 and 440 of FIG. 4A.

As further shown in FIG. 4A, process 400 may include receiving an indication to terminate the PDN session (block 435). For example, MME 215 may receive an indication to terminate the PDN session from PGW 225. In some implementations, PGW 225 may send the indication after a PDN duration timer stored by PGW 225 expires. Additionally, or alternatively, PGW 225 may terminate one or more signaling sessions (e.g., by deleting signaling information stored in memory) after the PDN duration timer expires.

As further shown in FIG. 4A, process 400 may include terminating the PDN session (block 440). For example, based on receiving the indication from PGW 225, MME 215 may terminate one or more signaling sessions of the PDN session. For example MME 215 may terminate one or more signaling sessions by deleting signaling information stored in memory. Additionally, or alternatively, MME 215 may terminate one or more signaling sessions by providing instruction(s) to one or more network devices (e.g., SGW 220, PGW 225, etc.) to terminate the PDN session. Upon receiving the instruction(s), the network device(s) may delete signaling information stored in memory. In this way, MME 215, SGW 220, PGW 225, and/or other network devices may conserve memory resources by terminating a PDN session after the PDN session has expired.

In some implementations, process 400 may be performed for multiple PDN sessions associated with user device 205. Additionally, or alternatively, process 400 may be performed for PDN sessions associated with different user devices 205. Furthermore, as described below in connection with FIG. 4B, process 400 may be performed for one or more temporary default bearers that are established and released for a PDN sessions.

As shown in FIG. 4B, process 400 may include receiving a second request for a PDN connection for a user device (block 445). For example, MME 215 may receive a second request to establish a PDN connection for user device 205. The second request may be received after receiving a first request to establish a PDN session, establishing the PDN session with a temporary default bearer, and releasing the temporary default bearer while maintaining signaling session(s) for the PDN session (e.g., as described above in connection with FIG. 4A). In other words, the second request may be received after releasing a temporary default bearer associated with a PDN session, but before terminating the PDN session. MME 215 may process the second request to determine whether to establish a new temporary default bearer for the existing PDN session, or whether to establish a new PDN session, as described below.

In some implementations, MME 215 may receive the second request from user device 205. For example, user device 205 may determine that user device 205 has uplink data to be sent to PGW 225. In this case, user device 205 may send a signaling message to MME 215 (e.g., a "PDN Connection Request" message) to request a PDN session for user device 205. (e.g. to request that a temporary default bearer be established between SGW 220 and PGW 225 and that a connection be established between SGW 220 and base station 210). In this way, user device 205 may transmit the uplink data (e.g., using the PDN session) to PGW 225, and PGW 225 may deliver the data according to the destination address of included in a packet of the uplink data (e.g., to PDN 245).

In some implementations, MME 215 may receive the second request from PGW 225. Additionally, or alternatively, the second request from user device 205 may be initiated by PGW 225. For example, PGW 225 may determine that PGW 225 has downlink data to be sent to user device 205. PGW 225 may receive the downlink data when there is a PDN session associated with user device 205, but no default bearer associated with user device 205. In this case, PGW 225 may send a signaling message to MME 215, indicating that PGW 225 has received downlink data to be sent to user device 205. This signaling message may be sent using a first signaling session between PGW 225 and SGW 220 and a second signaling session between SGW 220 and MME 215, which have been maintained after a temporary default bearer between PGW 225 and SGW 220 has been released. In some implementations, PGW 225 may store the downlink data, rather than SGW 220, because there is no bearer between PGW 225 and SGW 220 to support transmission of the downlink data from PGW 225 to SGW 220 for storage.

Based on receiving the signaling message from PGW 225, MME 215 may identify base station 210 that serves user device 205 (e.g., based on a stored location associated with user device 205), and may instruct base station 210 to page user device 205. User device 205 may receive the page, and may send a request to MME 215 to re-establish a radio resource control (RRC) connection with base station 210. Additionally, or alternatively, user device 205 may send the second request, to establish a PDN session for user device 205, to MME 215. In this way, user device 205 may be alerted by PGW 225 about the pending downlink data even though a default bearer associated with user device 205 has been released, thereby conserving network resources.

As further shown in FIG. 4B, process 400 may include determining whether the user device is assigned to a valid SGW and/or PGW (block 450). For example, MME 215 may identify an SGW 220 and a PGW 225 assigned to user device 205, and may determine whether user device 205 is located in a coverage area served by the identified SGW 220 and PGW 225. In some implementations, MME 215 may determine a geographic location associated with user device 205, such as by using a tracking area code (TAC), a cell identifier, a base station identifier, or the like. In some implementations, the geographic location of user device 205 may be identified in the second request received by MME 215.

MME 215 may use the geographic location associated with user device 205 to determine whether user device 205 is in a coverage area served by an SGW 220 and a PGW 225 previously assigned to serve user device 205. For example, MME 215 may have assigned the SGW 220 and PGW 225 to serve user device 205 when a PDN session was previously established (e.g., as describe above in connection with block 420).

As further shown in FIG. 4B, if the user device is not assigned to a valid SGW and/or PGW (block 450—NO), then process 400 may include establishing a new PDN session, with a temporary default bearer, using a different SGW and/or PGW (block 455). For example, if MME 215 determines that user device 205 has moved to a location that is not served by an SGW 220 and/or a PGW 225 that was previously assigned to user device 205, then MME 215 may identify a new SGW 220 and/or a new PGW 225 to be assigned to user device 205. In some implementations, one of SGW 220 or PGW 225 may be invalid for user device 205 that has moved to a different location. In some implementations, both SGW 220 and PGW 225 may be invalid for user device 205 that has moved to a different location.

If a previously assigned SGW 220 is invalid for user device 205, then MME 215 may provide an instruction to the previously assigned SGW 220 (e.g., an old SGW 220) to release a signaling session associated with user device 205. Based on this instruction, the old SGW 220 may delete signaling information stored in association with user device 205. In some implementations, the instruction may include a user device identifier, a network device identifier, or the like, and the old SGW 220 may use this information to identify signaling information to be deleted.

Additionally, or alternatively, if a previously assigned SGW 220 is invalid for user device 205, then MME 215 may identify a new SGW 220 to serve user device 205. MME 215 may provide an instruction to the new SGW 220 to establish a new PDN session with a new temporary default bearer. Based on this instruction, the new SGW 220 may establish one or more signaling sessions for the PDN session associated with user device 205. For example, the new SGW 220 may establish a new signaling session with MME 215 and/or PGW 225.

Additionally, or alternatively, MME 215 may delete an old signaling session with the old SGW 220, and may establish a new signaling session with the new SGW 220. Additionally, or alternatively, MME 215 may provide an instruction to PGW 225 to delete an old signaling session with the old SGW 220, and to establish a new signaling session with the new SGW 220. In some implementations, signaling sessions that are not impacted by the new SGW 220 (e.g., a signaling session between PGW 225 and PCRF 235, a signaling session between PGW 225 and AAA 240, etc.) may be maintained. The new signaling sessions described above may be maintained when the new temporary default bearer is released, in a similar manner as described above in connection with FIG. 4A.

If a previously assigned PGW 225 is invalid for user device 205, then MME 215 may provide an instruction to the previously assigned PGW 225 (e.g., an old PGW 225) to release a signaling session associated with user device 205. In some implementations, MME 215 may not provide the instruction to the old PGW 225 because the old PGW 225 may store a PDN duration timer that indicates when to release the signaling session. Based on the instruction, or based on expiration of the PDN duration timer, the old PGW 225 may delete signaling information stored in association with user device 205 and all signaling sessions for user device 205. In some implementations, PGW 225 may inform PCRF 235, SGW 220, and/or MME 215 so that these devices may delete the signaling session information associated with the old PDN session and hence the old PDN session will no longer exist.

Additionally, or alternatively, if a previously assigned PGW 225 is invalid for user device 205, then MME 215 may identify a new PGW 225 to serve user device 205. MME 215 may provide an instruction (e.g., a "Create Session Request" message) to the new PGW 225 to establish a new PDN session with a new temporary default bearer. In some implementations, the instruction may include a PDN duration timer, which may be stored by the new PGW 225. Based on the instruction, the new PGW 225 may establish the PDN session (e.g., one or more signaling sessions for the PDN session) and/or may establish the temporary default bearer, as described elsewhere herein. As an example, the new PGW 225 may establish a new signaling session with SGW 220, PCRF 235, AAA 240, and/or a network device associated with PDN 245.

Additionally, or alternatively, MME 215 may delete an old signaling session with the old PGW 225, and may establish a new signaling session with the new PGW 225. Additionally, or alternatively, MME 215 may provide an instruction to SGW 220 to delete an old signaling session with the old PGW 225, and to establish a new signaling session with the new PGW 225. In some implementations, signaling sessions that are not impacted by the new PGW 225 (e.g., a signaling session between MME 215 and SGW 220, etc.) may be maintained. The new signaling sessions described above may be maintained when the new temporary default bearer is released, in a similar manner as described above in connection with FIG. 4A.

As further shown in FIG. 4B, if the user device is assigned to a valid SGW and PGW (block 450—YES), then process 400 may include determining whether the user device has an existing PDN session (block 460). For example, MME 215 may determine whether the request is for an existing PDN session that was previously established (e.g., as described above in connection with FIG. 4A). In other words, MME 215 may determine whether user device 205 has an existing PDN session. In some implementations, the request may include a network identifier, such as an access point name (APN), that identifies a PDN 245 to which user device 205 is requesting access. Additionally, or alternatively, the network identifier may be associated with a PGW 225 that provides access to the PDN 245 to which user device 205 is requesting access. MME 215 may use the network identifier to determine whether the request is a request associated with an existing PDN session or a new PDN session (e.g., based on stored signaling information, such as a network identifier that identifies PDN 245, a network device identifier that identifies PGW 225, or the like).

Process 400 shows MME 215 determining whether user device 205 is assigned to a valid SGW 220 and/or PGW 225 (block 450) before determining whether the user device has an existing PDN session (block 460). However, in some implementations, MME 215 may determine whether the request is for an existing PDN session before determining whether user device 205 is assigned to a valid SGW 220 and/or PGW 225.

As further shown in FIG. 4B, if the user device does not have an existing PDN session (block 460—NO), then process 400 may include establishing a new PDN session for the user device (block 465). For example, if MME 215 determines that the request is not for an existing PDN session, then MME 215 may establish a new PDN session for user device 205 in a similar manner as described above in connection with block 420 of FIG. 4A. In some implementations, the new PDN session may use a temporary default bearer.

In some implementations, MME 215 may send an instruction (e.g., a "Create Session Request" message) to SGW 220 and/or PGW 225 to establish the new PDN session. PGW 225 may receive the instruction, and may determine that the instruction is for a new PDN session (e.g., because information provided by user device 205 is not associated with any existing PDN session and/or user device 205 is not stored in memory). In this case, PGW 225 may establish the new PDN session as described elsewhere herein in connection with block 420 of FIG. 4A.

As further shown in FIG. 4B, if the user device has an existing PDN session (block 460—YES), then process 400 may include establishing a new temporary default bearer using a maintained signaling session for the existing PDN session (block 470). For example, if MME 215 determines that the request is for an existing PDN session (e.g., that user device 205 has an existing PDN session), then MME 215 may establish a new temporary default bearer, for the existing PDN session, using one or more maintained signaling sessions.

In some implementations, MME 215 may provide an instruction, to establish the new temporary default bearer, via an existing signaling session. For example, MME 215 may identify a signaling session with SGW 220, and may provide the instruction to SGW 220 via the signaling session (e.g., using a TEID that identifies SGW 220 assigned for user device 205). Additionally, or alternatively, MME 215 may use an existing signaling session with SGW 220 to send an instruction destined for PGW 225, and SGW 220 may send the instruction to PGW 225 using an existing signaling session between SGW 220 and PGW 225 (e.g., using an IMSI that identifies PGW 225). In some implementations, MME 215 may send the instruction using a "Modify Bearer Request" message, a "Create Session Request" message, or another type of message.

PGW 225 may use stored signaling information to assist with establishing the temporary default bearer. For example, PGW 225 may have already authenticated user device 205, may have already obtained policy information associated with user device 205, or the like, and may conserve network resources and processing resource that would otherwise be consumed to re-authenticate user device 205, to re-obtain the policy information, or the like. Once PGW 225 has established the new temporary default bearer for user device 205, PGW 225 can send downlink data to user device 205, and user device 205 can send uplink data to PGW 225.

As described herein, network devices may maintain signaling information associated with a PDN session after releasing a temporary default bearer associated with the PDN session. In this way, the network devices conserve network resources and processing resources when a new temporary default bearer is established for the PDN session.

Although FIGS. 4A and 4B show example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive a request to establish a packet data network (PDN) session for a user device;
provide a first instruction to establish the PDN session for the user device using a temporary default bearer based on receiving the request,
the temporary default bearer being maintained for less than a duration of the PDN session;
receive an indication to release the temporary default bearer after providing the first instruction to establish the PDN session; and
provide a second instruction to release the temporary default bearer and maintain one or more signaling sessions associated with the PDN session based on receiving the indication to release the temporary default bearer,
signaling information, associated with the one or more signaling sessions, being stored based on the PDN session being established and continuing to be stored after the temporary default bearer is released,
the signaling information including an identifier for the user device and a network device identifier associated with the PDN session, and
the one or more signaling sessions, associated with the PDN session, being maintained after the temporary default bearer has been released.

2. The device of claim 1, where the second instruction causes the one or more signaling sessions to be maintained when there are no bearers associated with the PDN session.

3. The device of claim 1, where the one or more signaling sessions include at least one of:
a signaling session between a mobility management entity device (MME) and a serving gateway (SGW),
a signaling session between the SGW and a PDN gateway (PGW),
a signaling session between the PGW and an authentication, authorization, and accounting server (AAA), or
a signaling session between the PGW and a policy charging and rules function device (PCRF).

4. The device of claim 1, where the one or more processors are further to:
determine that the user device supports temporary default bearers and/or that the user device is permitted to use temporary default bearers; and
where the one or more processors, when providing the first instruction, are to:
provide the first instruction based on determining that the user device supports temporary default bearers and/or that the user device is permitted to use temporary default bearers.

5. The device of claim 1, where the one or more processors, when receiving the indication to release the temporary default bearer, are to:
receive the indication to release the temporary default bearer based on at least one of:
an expiration of a first bearer release timer stored by the user device, or
an expiration of a second bearer release timer stored by a network device.

6. The device of claim 1, where the signaling information is stored until an indication to terminate the PDN session is received,
the one or more signaling sessions being maintained based on storage of the signaling information.

7. The device of claim 1, where the one or more processors, when providing the first instruction, are to:
provide a PDN duration timer that indicates an amount of time for which the one or more signaling sessions are to be maintained; and
where the one or more processors are further to:
receive an indication to terminate the PDN session based on expiration of the PDN duration timer; and
provide a third instruction to terminate the PDN session based on receiving the indication to terminate the PDN session,
the one or more signaling sessions, associate with the PDN session, being released based on the third instruction.

8. A method, comprising:
receiving, by a device, a request to establish a packet data network (PDN) session for a user device;
establishing, by the device, the PDN session for the user device using a temporary default bearer based on receiving the request,
the temporary default bearer being maintained for less than a duration of the PDN session;
determining, by the device, to release the temporary default bearer after establishing the PDN session using the temporary default bearer;
releasing, by the device, the temporary default bearer based on determining to release the temporary default bearer; and
maintaining, by the device, one or more signaling sessions associated with the PDN session after releasing the temporary default bearer,
signaling information, associated with the one or more signaling sessions, being stored based on the PDN session being established and continuing to be stored after the temporary default bearer is released,
the signaling information including an identifier for the user device and a network device identifier associated with the PDN session.

9. The method of claim 8, where the device is a mobility management entity device (MME) or a PDN gateway (PGW).

10. The method of claim 8, where determining to release the temporary default bearer comprises:
determining to release the temporary default bearer based on an expiration of a bearer release timer started based on establishing the PDN session using the temporary default bearer.

11. The method of claim 8, further comprising:
receiving, via the one or more signaling sessions, an indication that there is downlink data to be sent to the user device; and
paging the user device to indicate that there is downlink data to be sent to the user device.

12. The method of claim 8, where the identifier for the user device includes at least one of:
an Internet Protocol (IP) address,
an international mobile subscriber identity (IMSI),
a temporary mobile subscriber identity (TMSI), or
a globally unique temporary identifier (GUTI).

13. The method of claim 8, further comprising:
receiving an indication to terminate the PDN session; and
deleting the signaling information from storage based on receiving the indication to terminate the PDN session.

14. A non-transitory computer-readable medium storing instructions, the instructions comprising:
one or more instructions that, when executed by one or more processors, cause the one or more processors to:
receive a request to establish a packet data network (PDN) session for a user device;
provide a first instruction to establish the PDN session for the user device using a temporary default bearer based on receiving the request,
the temporary default bearer being maintained for less than a duration of the PDN session;
receive an indication to release the temporary default bearer after providing the first instruction to establish the PDN session; and
provide a second instruction to release the temporary default bearer and maintain one or more signaling sessions associated with the PDN session based on receiving the indication to release the temporary default bearer,
signaling information, associated with the one or more signaling sessions, being stored based on the PDN session being established and continuing to be stored after the temporary default bearer is released,
the signaling information including an identifier for the user device and a network device identifier associated with the PDN session, and
the one or more signaling sessions, associated with the PDN session, being maintained after the temporary default bearer has been released.

15. The non-transitory computer-readable medium of claim 14, where the second instruction causes the one or more signaling sessions to be maintained when there are no bearers associated with the PDN session.

16. The non-transitory computer-readable medium of claim 14, where the one or more signaling sessions include at least one of:
a signaling session between a mobility management entity device (MME) and a serving gateway (SGW),
a signaling session between the SGW and a PDN gateway (PGW),
a signaling session between the PGW and an authentication, authorization, and accounting server (AAA), or
a signaling session between the PGW and a policy charging and rules function device (PCRF).

17. The non-transitory computer-readable medium of claim 14, where the one or more instructions, when executed by the one or more processors, further cause the one or more processors to:
determine that the user device supports temporary default bearers and/or that the user device is permitted to use temporary default bearers; and
where the one or more instructions, that cause the one or more processors to provide the first instruction, cause the one or more processors to:
provide the first instruction based on determining that the user device supports temporary default bearers and/or that the user device is permitted to use temporary default bearers.

18. The non-transitory computer-readable medium of claim 14, where the one or more instructions, that cause the one or more processors to receive the indication to release the temporary default bearer, cause the one or more processors to:
receive the indication to release the temporary default bearer based on at least one of:
an expiration of a first bearer release timer stored by the user device, or
an expiration of a second bearer release timer stored by a network device.

19. The non-transitory computer-readable medium of claim 14, where the signaling information is stored until an indication to terminate the PDN session is received,
the one or more signaling sessions being maintained based on storage of the signaling information.

20. The non-transitory computer-readable medium of claim 14, where the one or more instructions, that cause the one or more processors to provide the first instruction, cause the one or more processors to:
provide a PDN duration timer that indicates an amount of time for which the one or more signaling sessions are to be maintained; and
where the one or more instructions, when executed by the one or more processors, further cause the one or more processors to:
receive an indication to terminate the PDN session based on expiration of the PDN duration timer; and
provide a third instruction to terminate the PDN session based on receiving the indication to terminate the PDN session,
the one or more signaling sessions, associate with the PDN session, being released based on the third instruction.

* * * * *